UNITED STATES PATENT OFFICE.

FERDINAND EPHRAIM, OF SANTA BARBARA, CALIFORNIA, ASSIGNOR OF ONE-HALF TO LOUIS OETTINGER, OF MEXICO, MEXICO.

VARNISH.

966,814.  Specification of Letters Patent.  Patented Aug. 9, 1910.

No Drawing.  Application filed August 28, 1907. Serial No. 390,544.

*To all whom it may concern:*

Be it known that I, FERDINAND EPHRAIM, a citizen of the United States, and a resident of Santa Barbara, in the county of Santa Barbara and State of California, have invented a new and Improved Varnish, of which the following is a full, clear, and exact description.

My invention relates to substances extracted from certain plants and more particularly to shellac-like gum extracted from the plant commonly known in northern Mexico and along the Rio Grande as the ocotilla, the botanical name being *Fouquiera*, of which there are four species, one being the *Fouquiera splendens*. The *Fouquiera* grows wild in arid regions and deserts, and up to the present time has been practically useless for any purpose.

I find that by proper manipulation, a gum can be extracted from the *Fouquiera*, this gum having many of the properties of shellac and being suitable for working up into varnishes.

From numerous experiments I have found that the ocotilla plant, aside from the water it contains, consists mainly of vegetable fibers and a solid gum very much like shellac. This gum constitutes from twelve to eighteen per cent. of the total plant. It dissolves readily in alcohol and other gum solvents, including alkaline solutions. It is usually soluble in acetylene tetrachlorid and when subjected to the action of this solvent, it forms therewith a varnish. After the gum has been dissolved out from the other organic material of the plant and becomes a part of the fluid of the solvent, and the liquid thus formed is caused to evaporate, there remains a solid residual gum analogous to shellac. This residuum serves as a base for further operations. It may be used for almost any purpose for which the shellac of commerce is employed, for instance, the manufacture of sealing wax, stiffening of felt hats, the manufacture of lacquers and in the manufacture of varnishes.

In separating the gum from the ocotilla plant the stalks or the entire plant in its natural state is removed from its embedment and subjected to heat, such as heat of the sun or the heat of dry air. This extracts the moisture from the plant and causes decomposition to set in. The stalk, the plant as a whole, or any part thereof may be suspended in any liquid capable of dissolving shellac or of dissolving lacquers. However, I find it more advantageous for recovering a larger per cent. of the gum, to break, crush or pulverize the ocotilla plant into fine particles, the comminuted material thus formed being next submerged or suspended within a solvent liquid. This permits the solvent liquid to attack the particles of organic matter containing the gum, softening not only the gum but the tissues containing the same and by degrees dissolves the softened tissue. I find further that all parts of the tissues except those containing hard fiber, are assimilated by the liquid and form a very close physical union therewith. The liquid now laden with the soluble gum of the ocotilla plant, is strained so as to leave the fiber freed and separated from the gum. The strained liquid, consisting of solvent fluid holding in solution the gum, forms an article of commerce, and within itself constitutes a very good varnish. I find that it may be used by itself as a varnish or may be mixed with other ingredients with which varnishes are ordinarily mixed in commerce. When the liquid recovered is completely evaporated, a crystalline residuum remains, and this also constitutes a material of commerce, being analogous to shellac or to similar materials employed in the manufacture of lacquers.

Among the solvents which may be employed as above described for dissolving the shellac-like gum from the plant are ordinary commercial alcohol, absolute alcohol (either of these alcohols being preferably heated) and ordinary commercial alcohol mixed with liquefied caustic soda. I also find that alcohol of almost any kind, when admixed with ammonia makes a suitable solvent for the purpose in question and acts more quickly than the other solvents mentioned. Acetylene tetrachlorid mixed with ammonia is also suitable for the purpose.

Having thus described my invention, I claim as new and desire to secure by Letters Patent:

As an article of manufacture, a varnish, the base of which is the gum from the ocotilla plant.

In testimony whereof I have signed my name to this specification in the presence of two subscribing witnesses.

FERDINAND EPHRAIM

Witnesses:
JARED J. LUSSNER,
E. F. FLETCHER.